Patented Aug. 22, 1950

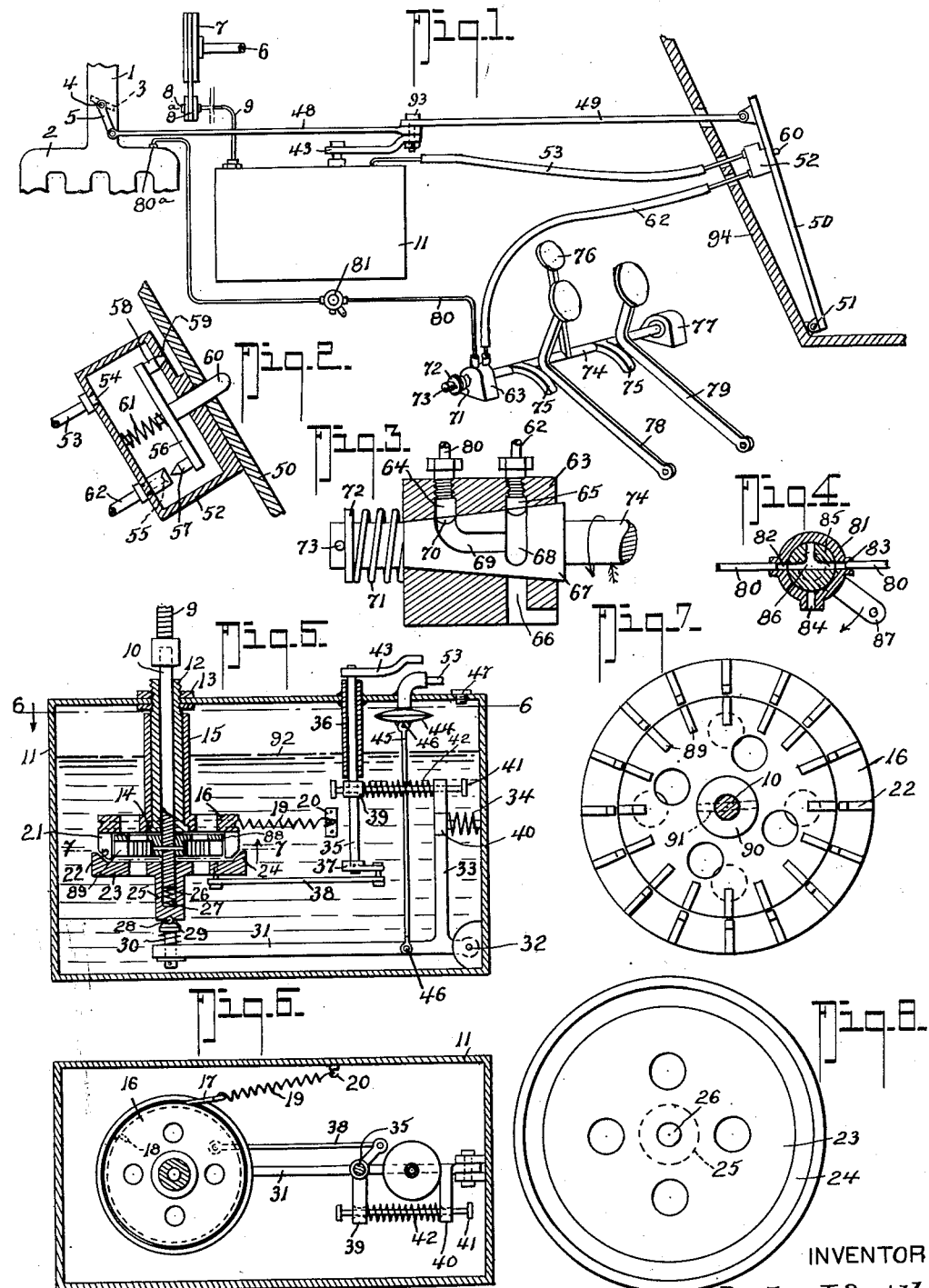

2,519,510

UNITED STATES PATENT OFFICE 2,519,510

POWER CONTROL

Reuben T. Smith, Calhoun City, Miss.

Application May 31, 1946, Serial No. 673,579

7 Claims. (Cl. 192—.058)

In operating or driving motor vehicles which are propelled by a prime mover, and in the control of the power or speed of the prime mover, the operator frequently is obliged to maintain, for considerable periods of time, a certain setting of the throttle or control means against force, as for instance, a spring or counterweight tending to restore the control means to the "closed throttle" or "off" position. This results in the operator becoming fatigued.

Furthermore, it is often desirable to maintain a predetermined speed, rather than a predetermined value of "throttle opening" or "power output."

It is therefore the primary object of the present invention to combine a governor with a control clamping means which, without more than the usual attention on the part of the operator, will function to provide the advantage of not being necessary constantly to hold pressure against the throttle closing means, without the inherent danger of positively holding open the throttle by means not directly operated by the self-closing throttle control.

The invention also has for an object to provide quick reduction of throttle opening or power output when certain associated controls of the controlled prime mover are operated (as, for instance, the depressing of either a clutch pedal or a brake pedal or both) without any distracting attention on the part of the operator.

Other objects will in part be obvious and in part be pointed out hereinafter.

To the attainment of the aforesaid objects and ends, invention also resides in the novel details of construction, combination and arrangement of parts all of which will be hereinafter first fully described and then be specifically pointed out in the appended claims, reference being had to the accompanying drawing in which:

Fig. 1 is a diagrammatic or schematic view of my invention.

Fig. 2 is an enlarged detail vertical section through the foot-operated valve mounted on the accelerator pedal or throttle lever.

Fig. 3 is an enlarged detail vertical section of the second valve on the pedal-operated rock shaft.

Fig. 4 is a detail section of the two-way valve shown in Fig. 1.

Fig. 5 is an enlarged central vertical longitudinal section of the speed-control governor device.

Fig. 6 is a horizontal section on the line 6—6 of Fig. 5.

Fig. 7 is a horizontal section on the line 7—7 of Fig. 5.

Fig. 8 is a top plan view of the lower clutch member.

In the drawing in which like numerals and letters of reference indicate like parts in all the figures. 1 is the throttle duct to the intake manifold 2, in which duct the usual throttle valve 3 is carried on a shaft 4. An arm 5 is provided on the outer end of shaft 4 for purposes presently referred to.

6 is a shaft which turns at a speed proportional to the speed of the vehicle or prime mover and carries a pulley 7 which drives a pulley 8 by a connecting belt 8a. The pulley 8 in turn drives a flexible shaft 9 that extends to the shaft 10 of a combined speed governor and throttle valve "locking" device. Said device includes a closed casing 11 containing, preferably, a suitable hydraulic fluid 92. The shaft 10 rotates freely in a bearing sleeve 12 and has a flange 14 at its lower or inner end. The bearing sleeve 12 is rigidly secured to the casing 11 by nuts 13. Mounted to turn on the bearing sleeve 12 is the sleeve 15 of a peripherally grooved disc or plate 16, which carries vanes 21 having their lower ends bevelled as at 22. The disc or plate 16 with its vanes 21 comprises one element of a clutch device, the other element of which comprises a disc or plate 23 having a bevelled annular flange 24 to cooperate with the vanes 21 as will later more clearly appear. A strap 17 has one end anchored at 18 in the groove of the disc or plate 16 and has its other end connected to a spring 19 that is anchored to the case 11 as at 20. The spring tends to turn disc 16 in one direction and bring it back to a rest position.

The disc 23 has a hub 25 which has a bearing recess 26 into which shaft 10 sets on a coil spring 27. The bottom of the hub 25 is closed and rests on an anti-friction bearing 28 held by a spring loaded bearing member 29. The member 29 is yieldingly mounted on one arm 31 of a bell crank lever that is pivoted at 32 to the casing 11, on a spring 30.

The bell crank lever has another arm 33 between which and the casing 11 is a push spring 34 which constantly urges the bell crank lever to turn in one direction on its pivot 32.

36 is a bearing sleeve welded or otherwise secured to the wall of the casing 11 and in which is mounted a shaft 35, one end of which extends to the outside of the casing and has an attached arm or lever 43 later again referred to. To the lower end of shaft 35 is attached an arm or lever 37, the free end of which is pivoted to one end of a connecting rod 38 whose other end is pivoted, at a suitable place, to the disc or plate 23 (see Figs. 5 and 6). A third arm 39 is secured to shaft 31 below bearing sleeve 36, through an aperture in which a headed rod 41 freely passes, the rod 41 also freely passing through a hole in a portion 40 of the bell crank arm 33. A coil spring 42 on rod 41 serves to separate arms 33 and 39 when the governing action is not in use, but is caused to be without effect when the governing action is brought into use since the energizing of diaphragm unit 44 moves rod 45 to move bell-crank levers 31—33 to compress and hold ineffective spring 34, and permitting spring 42 to float in the increased distance between levers 33 and 39 without pressure on lever 39 tending to close the throttle.

A bellows 44 contained within the case 11 is securely held on a wall of the case and is connected to the arm 31 by connecting rod 45 pivoted to the same as at 46. Secured to shaft 10 and located between the upper and lower discs or plates 16 and 23 respectively is an impeller 88 having radial vanes 89 to cooperate with the vanes 21. The hub 90 of impeller 88 is pinned at 91 to shaft 10 as shown in Fig. 7.

Hydraulic fluid 92 is placed in the casing 11 to a suitable depth, via an aperture in the casing which has a removable closure plug 47.

The arm 5 and the accelerator pedal 50 are operatively connected together and to lever or arm 43 by a common pivotal connection 93, via connecting rods 48 and 49 respectively. The pedal 50 is pivoted at 51 to the foot board 94 or other suitable place on the vehicle.

52 designates a valve device casing mounted on the accelerator pedal. As best shown in Fig. 2 the valve device consists of a casing 52 having a port 54 to which one end of a duct 53 connects, a valve controlled port 55 to which one end of a duct 62 connects, a valve controlled port 59 to atmosphere, a push rod 60 on a valve carrier 56 which carrier has a valve 58 for port 59 and a valve 57 for port 55. The valves 57 and 58 operate alternately. A spring 61 constantly tends to push the valve carrier 56 and plunger 60 outwardly and normally hold valve 58 to close port 59 and hold valve 57 to open port 55.

A duct 62 has one end connected with port 55. The other end of the duct 62 connects with a port 65 in a second valve device casing 63 best shown in Fig. 3.

A rock shaft 74 is mounted in suitable bearings 63, 77 and carries a pedal 76. The bearing 63 also serves as the casing for the tapered or plug valve 67 on one end of the shaft 74.

The plug valve 67 has a semi-circular groove which registers with port 65 when in one position and with an air port 66 when the plug valve is in another position. The valve 67 also has a groove 70 to register with a port 64 in casing 63 when the valve is in the first stated position. A groove 69 connects grooves 68 and 70 at all times. A spring 71, washer 72 and pin 73 keep the plug valve 67 seated.

The rock shaft 74 has fingers or cams 75 to cooperate with the brake and clutch pedal levers 79 and 78 respectively. A duct 80 connects the intake manifold 2, at 80ª with port 64 via a two way valve device 81.

The valve device 81 has ports 82, 83 to which duct 80 connects, and a port 84 to atmosphere. The valve proper 85 has a T-passage 86 to effect communication between ports 82, 83 or 83, 84, accordingly as the valve is in one position or another. A handle 87 is provided, by means of which valve 85 can be turned by hand.

*Operation*

Assume that the vehicle or prime mover has been brought to a desired speed in the conventional way. With valve device 81 open to effect communication between the two adjacent ends of the duct 80, the operator depresses control pedal 76 to rotate shaft 74 to operate valve device to a position where passage 69 communicates with ducts 62, 80 permitting the partial vacuum in manifold 2, through connection 80ª, duct 80 and valve device 81, valve device 63, valve device 52, duct 53 to bellows or diaphragm unit 44, and operating rod 45 to rock bell crank 31, 33 and lift arm 31.

Lifting arm 31 raises disc 23 to bring it into clutching relation to vanes 21 and thereby locks discs 16 and 23 together (operator having removed pressure from pedal 50 in such manner as to permit valve 58 to close port 59 and valve 57 to open port 55).

Since disc or plate 16 constantly assumes a position (by action of fluid from impeller 88 impinging on vanes 21 and opposed in rotation by spring 19) corresponding to the rotative speed of shaft 10, plate 23 will now move with plate 16 in one direction of rotation if shaft 10 increases in rotative speed and in the opposite direction upon a decrease of rotative speed of shaft 10. Plate 23, being connected through linkage 38 and arm 37 to shaft 35, will turn said shaft 35 in corresponding directions and transmit the necessary movements to the throttle valve to move it in the direction to maintain the chosen speed of the controlled vehicle or prime mover.

Since the clutching action between plates 16 and 23 is made to occur at the will of the operator at any chosen speed, the governing action is not confined to any one speed, but will tend to maintain any chosen speed within the capability of the controlled prime mover.

Recovery by the operator of control from governed speed is by pressure at pedal 50 sufficient to operate valve 52, whereupon the effect of vacuum or pressure is removed by action of valves 58, 57 as above described, permitting spring 27 to move plate 23 out of clutching position with plate 16 and permitting spring 34 to move lever arm 33 to bring spring 42 into effect, tending to close the throttle; pedal 50 will now function in the conventional manner, responding to pressure upon pedal 50 to open the throttle and responding to spring 42 to close the throttle.

Also, upon operation of either or both of the associated controls 78, 79 (shown as clutch and brake pedals), cams 75 will be operated to rotate shaft 74 so as to operate valve 67 to the position of shut-off to the vacuum line connection 80 and establish a path through the passage 68 and connection 62 to open duct 62 to atmosphere via port 66, thus relieving partial vacuum or pressure at vacuum unit 44 to permit pedal 50 to function conventionally as an "accelerator pedal" as above described.

While I have disclosed a governor of the hydraulic type, the advantages of this invention are not limited to the use of hydraulic fluid in casing 11. In the case of controlling an easily operated throttle, air might be the medium employed to transmit the rotative effect of vanes 89, 21 to plate 16, While I have disclosed the preferred embodiment of my invention, I desire it understood that modifications can readily be made by those skilled in the art which will fall within the scope of the appended claims.

Applicant is the applicant who on even date herewith filed applications Serial No. 673,577 now Patent #2,487,606 issued November 8, 1949, and Serial No. 673,578 now Patent #2,479,646 issued August 23, 1949.

What I claim is:

1. In apparatus of the class described, wherein is provided a vehicle having a prime mover, a throttle valve, and an accelerator lever, the improvement which includes: a governor device having a casing, a rotatable shaft, means operatively connecting said shaft to the throttle valve and to the accelerator pedal, a driven shaft, means operatively connected with and driven from a part of the vehicle which rotates proportionately to the speed of the vehicle, a spring-resisted clutch plate rotatably mounted concentrically on said driven shaft within said casing, a floating clutch plate mounted in said casing to cooperate with said spring-resisted clutch plate, a connecting rod between said floating clutch member and said rotatable shaft that is connected to the throttle valve and accelerator lever, means continuously tending to de-clutch said clutch plates, means carried by said driven shaft and said spring-resisted clutch plate for effecting rotation of said spring-resisted clutch plate in one direction, and means controlled from the accelerator lever for effecting a clutching action between said clutch plates at the will of the operator.

2. The apparatus of claim 1, wherein means are provided for effecting a de-clutching action between said clutch plates independently of said accelerator lever.

3. In motor vehicles having a prime mover and having a throttle valve, an accelerator lever, a clutch and a brake lever, and an operative connection between the throttle and the accelerator lever, and wherein is provided means for locking the throttle in any suitable desired position under control of the operator, the improvement which includes: a speed governor device, suction-operated means for operatively connecting said governor device with said throttle valve, means under control of the operator for controlling said suction-operated means to operatively connect and disconnect said governor device with said throttle valve at will and for locking said throttle valve operatively to said governor device for maintaining predetermined speeds, said operator-controlled means including a control valve mounted on the accelerator lever.

4. In motor vehicles having a prime mover and having a throttle valve, an accelerator lever, a clutch and a brake lever, and an operative connection between the throttle and the accelerator lever, and wherein is provided means for locking the throttle in any suitable desired position under control of the operator, the improvement which includes: a speed governor device, suction-operated means for operatively connecting said governor device with said throttle valve, means under control of the operator for controlling said suction-operated means to operatively connect and disconnect said governor device with said throttle valve at will and for locking said throttle valve operatively to said governor device for maintaining predetermined speeds, said operator-controlled means including a control valve mounted on the accelerator lever, and a suction-release valve operative by the clutch and brake levers for purposes described.

5. In motor vehicles having a prime mover provided with a throttle valve, a shaft rotatable at speeds proportional to that of the vehicle or prime mover, a brake mechanism including a brake lever, and an accelerator lever operatively connected with said throttle valve, the improvement which includes: a speed governor, suction-operated means for connecting said speed governor with said throttle valve to maintain the speed of the vehicle at any suitable throttle setting by said accelerator lever, and means on the accelerator lever for controlling said suction means to operatively connect and disconnect said governor to and from said throttle valve.

6. The improvement of claim 5, wherein means operative by the brake-lever of the vehicle is provided for operatively disconnecting the governor from the throttle valve upon application of the brake.

7. In apparatus of the class described wherein is provided a vehicle having a prime mover, a throttle valve, and an accelerator lever, the improvement which comprises a hydraulic speed governor that includes a driven shaft driven while the vehicle is in motion at a speed proportionately to the vehicle speed, a spring-resisted clutch plate rotatably mounted on said driven shaft, a floating clutch plate mounted to cooperate with said spring-resisted clutch plate when engaged therewith, an operative connection between said floating clutch plate and said throttle valve and said accelerator lever, a lever for moving said floating clutch plate into engagement with said spring-resisted clutch plate, a floating connecting rod between said lever and said connection between said floating clutch plate and said throttle valve, a spring on said floating connecting rod operative between said lever and said connection between said floating clutch plate and said throttle valve, and a stronger spring engaging said lever to oppose the action of said spring on said rod, and means mounted on said accelerator lever for effecting operation of said floating clutch plate moving lever.

REUBEN T. SMITH.

REFERENCES CITED

The following references are of record in the file of this patent:

UNITED STATES PATENTS

| Number | Name | Date |
| --- | --- | --- |
| 1,987,275 | Tatter | Jan. 8, 1935 |
| 2,014,854 | Lothrop | Sept. 17, 1935 |
| 2,036,619 | Brown | Apr. 7, 1936 |
| 2,157,588 | Brewer | May 9, 1939 |
| 2,208,473 | Ross | July 16, 1940 |
| 2,224,600 | Howard | Dec. 10, 1940 |
| 2,230,335 | Smith | Feb. 4, 1941 |
| 2,230,742 | Bush | Feb. 4, 1941 |
| 2,243,354 | Musser | May 27, 1941 |